US009240878B2

(12) United States Patent
Velitheri et al.

(10) Patent No.: US 9,240,878 B2
(45) Date of Patent: Jan. 19, 2016

(54) APPARATUS, METHOD AND SYSTEM FOR ASYMMETRIC, FULL-DUPLEX COMMUNICATION

(71) Applicant: Lattice Semiconductor Corporation, Portland, OR (US)

(72) Inventors: Rahul Velitheri, Hyderabad (IN); Vinayak Agrawal, Hyderabad (IN); Namrta Sharma, Hyderabad (IN); Prashanth Tirunagari, Hyderabad (IN); Manjusha Manchikalapudi, Hyderabad (IN)

(73) Assignee: Lattice Semiconductor Corporation, Portland, OR (US)

( * ) Notice: Subject to any disclaimer, the term of this patent is extended or adjusted under 35 U.S.C. 154(b) by 96 days.

(21) Appl. No.: 14/165,345

(22) Filed: Jan. 27, 2014

(65) Prior Publication Data

US 2015/0215105 A1    Jul. 30, 2015

(51) Int. Cl.
*H04L 5/14* (2006.01)
*H04B 1/56* (2006.01)

(52) U.S. Cl.
CPC ...... *H04L 5/14* (2013.01); *H04B 1/56* (2013.01)

(58) Field of Classification Search
CPC .......................................................... H04L 5/14
See application file for complete search history.

(56) References Cited

U.S. PATENT DOCUMENTS

| | | | | |
|---|---|---|---|---|
| 4,355,214 | A | * | 10/1982 | Levy .................. H04B 3/23 370/291 |
| 5,579,305 | A | * | 11/1996 | Norrell ................ H04L 5/143 370/286 |
| 5,828,657 | A | * | 10/1998 | Betts .................. H04B 3/238 370/269 |
| 6,477,212 | B1 | | 11/2002 | Bingel et al. |
| 7,706,434 | B1 | | 4/2010 | Farjadrad et al. |
| 8,270,394 | B1 | | 9/2012 | Chen et al. |
| 2012/0281519 | A1 | | 11/2012 | Conway et al. |

OTHER PUBLICATIONS

PCT International Search Report and Written Opinion, PCT Application No. PCT/US2014/071302, Mar. 9, 2015, 11 pages.
Das, S.K. et al., "Beat Interference Penalty in Optical Duplex Transmission," Journal of Lightwave Technology, Feb. 2002, pp. 213-214, vol. 20, No. 2.
"Digital Visual Interface DVI: Revision 1.0," Digital Display Working Group, Apr. 2, 1999, pp. 33-53.

(Continued)

*Primary Examiner* — Hassan Kizou
*Assistant Examiner* — Ashil Farahmand
(74) *Attorney, Agent, or Firm* — Fenwick & West LLP

(57) ABSTRACT

Techniques and methods for performing asymmetric, full-duplex communication via a signal line. In an embodiment, a transceiver includes transmit circuitry to transmit a first signal via a node coupled to a signal line, where the first signal is transmitted concurrently with the transceiver receiving a second signal via the node at a substantially different data rate than that of the first signal. In another embodiment, signal processing circuitry of the transceiver detects a composite signal at the node, the composite signal including a combination of the first signal and the second signal. Based on the combination of the first signal and the second signal, the signal processing circuitry generates a processed signal, including the signal processing circuitry reducing a contribution by the first signal. The processed signal is provided to receiver circuitry of the transceiver.

14 Claims, 7 Drawing Sheets

(56) References Cited

OTHER PUBLICATIONS

"Display Port Standard, Version 1.1," DisplayPort™ Standard, VESA, Mar. 19, 2007, pp. 134-172.
"High-Definition Multimedia Interface: Specification Version 1.3," Hitachi, Ltd., Matsushita Electric Industrial Co., Ltd, Philips Consumer Electronics, International B.V., Silicon Image, Inc., Sony Corporation, Thomson Inc., Toshiba Corporation, Jun. 22, 2006, pp. 10-54.
"High-Definition Multimedia Interface: Specification Version 1.4a," Hitachi, Ltd., Panasonic Corporation, Philips Consumer Electronics, International B.V., Silicon Image, Inc., Sony Corporation, Technicolor, S.A., Toshiba Corporation, Mar. 4, 2010, pp. HEAC 4-25.

* cited by examiner

APPARATUS, METHOD AND SYSTEM FOR ASYMMETRIC, FULL-DUPLEX COMMUNICATION

BACKGROUND

1. Technical Field

Embodiments discussed herein generally relate to the field of electronic devices and more particularly, but not exclusively, to wire line communications.

2. Background Art

As integrated circuit (IC) design and fabrication techniques improve, successive generations of IC devices continue to scale in size. Attendant with smaller IC dimensions is a drastically increased ability of such ICs to receive, transmit and process data. This has resulted in a rapid growth of technologies which rely upon high-volume wire line communications. However, the channel capacity of various interconnect media, although improved, has not kept pace with the increased processing speeds of ICs.

One approach to overcoming channel capacity limitations is to design devices which accommodate a larger number of hardware channels. However, additional channels require additional contacts for connector pins, which increase device size and limit compatibility with legacy connectors. Another approach is for a device to support a type of bidirectional communication referred to as full-duplex over a single signal line. Full-duplex communication typically involves a device transmitting a signal to another device via a signal line, where the transmitting is concurrent with the device receiving via the same signal line another signal from that other device. Full-duplex is to be distinguished from half-duplex bidirectional communication over a single signal line, which typically involves a device performing some form of time-division multiplexing to distinguish periods which are for transmitting signals via a signal line from other periods which are for receiving signals via that same signal line.

Implementation of full-duplex communication is complicated by the need of a device to distinguish signal components which correspond to the other device's transmission from other signal components, concurrently on the same signal line, which correspond to that device's own transmission. The effectiveness of techniques to distinguish such receive signal components from transmit signal components is often limited when, as with high data rates and/or long channel paths, receive signal components are significantly attenuated, as compared to locally-generated transmit signal components. Distinguishing receive signal components from transmit signal components may also be complicated by other factors such as the presence of signal reflections from connectors or other various channel imperfections. As a result, current and next-generation wire line technologies are limited in their ability to efficiently and reliably accommodate full-duplex communication according to conventional techniques.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously include techniques and/or mechanisms for facilitating full-duplex communication between devices. Such full-duplex communication may be asymmetric at least with respect to data rates—e.g. where a data rate of a signal transmitted from a device via a signal line is different than a data rate of another signal concurrently received by the device via the same signal line. Alternatively or in addition, such full-duplex communication may be either via a signal line which is for single-ended communication or for differential communication. For example, the signal line may be one of two signal lines which are for a differential signal pair. In an embodiment, the full-duplex communication is to exchange a signal having non-return to zero (NRZ) encoding.

A transceiver to perform full-duplex communication according to an embodiment may include transmitter circuitry to drive a first signal for transmission via a signal line. Concurrent with transmission of such a first signal, the transceiver may receive via the same signal line a second signal from another device. Accordingly, the signal line may concurrently carry a composite signal which includes a combination of the first signal and the second signal. The transceiver may include circuitry to perform signal processing of such a composite signal to distinguish a component of the received second signal from a component of the first signal which is concurrently being transmitted.

As used herein, the term "transmit signal component" refers to a component of a signal which is transmitted by a transceiver, or by a device which includes such a transceiver, as part of full-duplex communications exchanged via a signal line. Similarly, the term "receive signal component," as used herein, refers to a component of a signal which is received by such a transceiver, or device including such a transceiver, as part of such full-duplex communications. Unless otherwise indicated, the term "signal processing" is used herein to refer to one or more operations for distinguishing a receive signal component from a transmit signal component.

Figure 1:
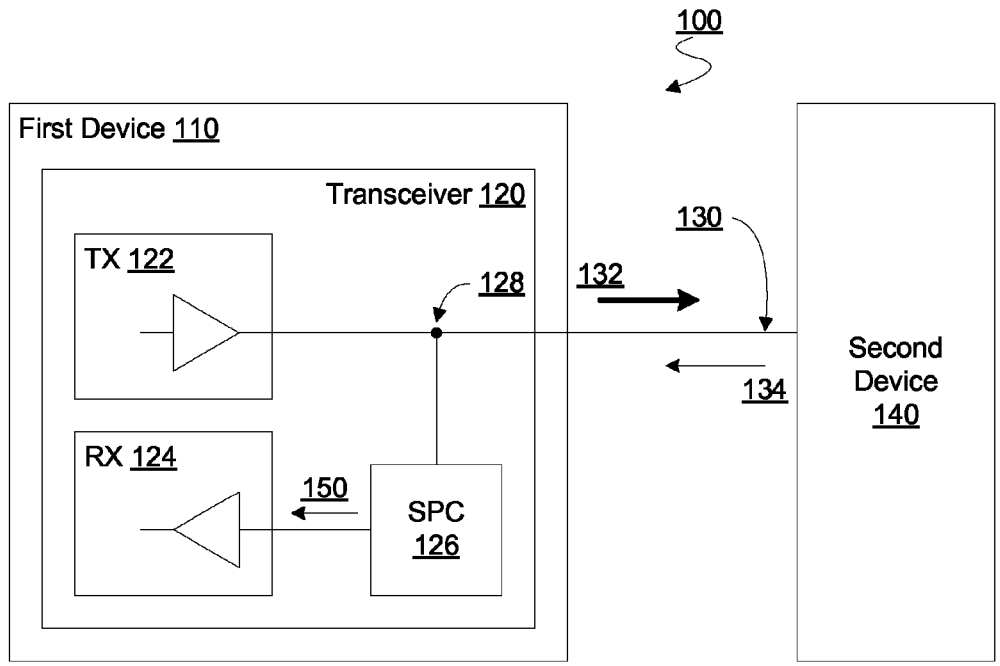
FIG. 1 is a block diagram illustrating elements of a system for performing full-duplex communication according to an embodiment.

FIG. 1 illustrates elements of a system 100 for performing full-duplex communication according to an embodiment. System 100 may include a first device 110 comprising transceiver 120 to variously implement communications between first device 110 and one or more other devices. For example, transceiver 120 may participate in full-duplex communications with a second device 120 of system 100. Such full-duplex communications may, for example, include signals 132, 134 being exchanged concurrently via a signal line 130 which couples first device 110 and second device 140 to one another. Embodiments may be variously implemented, for example, entirely by transceiver 120, by first device 110 as a whole or by system 100 as a whole.

First device 110 and second device 140 may be hardwired to one another via signal line 130 and, in certain embodiments, one or more additional signal lines (not shown). Alternatively, first device 110 may include connector hardware (not shown) for some or all such signal lines to be variously coupled to, or decoupled from, transceiver 120. In an embodiment, signal line 130 is one signal line of a signal line pair for differential signaling between first device 110 and second device 140.

As used herein, the term "source" refers to the characteristic of a device providing communications to some other device. Correspondingly, the term "sink" refers to the characteristic of a device receiving communications from some other (source) device. In an embodiment, first device 110 includes functionality of one or more conventional source devices. By way of illustration and not limitation, first device 110 may include functionality including, but not limited to, that of a personal computer (e.g. tablet, notebook, ultrabook, laptop, desktop and/or the like), camcorder, smart phone, video game console, television, monitor, display, set-top box, home theater receiver and/or the like. First device 110 may further include functionality of one or more conventional sink devices including, but not limited to, a television, monitor, display and/or the like. Second device 140 may also include functionality of one or more conventional source devices and functionality of one or more conventional sink devices. By way of illustration and not limitation, second device 140 may include some or all of the features of first device 110.

In an embodiment, transceiver 120 includes transmitter circuitry 122 to drive signal 132 for transmission from first device 110 to second device 140 via a node 128 which is coupled to signal line 130. Transmitter circuitry 122 may include functionality of any of various conventional transmitter including, but not limited to, buffering, digital-to-analog conversion, amplification, pre-driver logic, driver logic and/or the like. Transmitter circuitry 122 may include or couple to signal buffer circuitry which is coupled between node 128 and some or all of transmitter circuitry 122. Such signal buffer circuitry may include any of a variety of one or more circuit elements to provide a high output impedance path from transmitter circuitry 122 to node 128. By way of illustration and not limitation, such signal buffer circuitry may include a diode, amplifier and/or one or more transistors—e.g. of a signal driver—configured to provide at least partial isolation of some or all of transmitter circuitry 122 from signal 134. Transceiver 120 may further comprise signal processing circuitry (SPC) 126 coupled between node 128 and receiver circuitry 124 of transceiver 120.

At some point in time during full-duplex communication between 110 and second device 140, node 128 may include a composite signal comprising a combination of signal 132 and signal 134—e.g. where signals 132, 134 are superimposed on one another at node 128. Based on the combination of signals at node 128, signal processing circuitry 126 may provide active and/or passive signal processing to generate a processed signal 150 which it provided from signal processing circuitry 126 to receiver circuitry 124. Operation of signal processing circuitry 126 based on the signal combination at node 128 may include reducing a contribution by one or more signal components of signal 132. By way of illustration and not limitation, signal processing circuitry 126 may include active circuit elements and/or passive circuit elements to filter, subtract, attenuate or otherwise reduce a contribution by a component of signal 132 to processed signal 150—e.g. at least relative to a contribution by a component of signal 134 to processed signal 150. In an embodiment, generation of processed signal 150 is further based on SPC 126 receiving one or more additional inputs (not shown) from other circuitry of transceiver 120.

With the resulting processed signal 150 from signal processing circuitry 126, receiver circuitry 124 may be better able to identify information represented by signal 134. Receiver circuitry 124 may include functionality of any of various conventional receivers including, but not limited to, amplification, buffering, digital signal processing and/or the like.

Full-duplex communication between first device 110 and second device 140 may be asymmetric at least with respect to data rate. For example, while they are concurrently being exchanged in different respective directions along signal line 130, signals 132, 134 may have different respective bits-per-second rates of communication. Certain embodiments variously exploit such a data rate differential to provide for simplified and/or otherwise improved mechanisms for receiver circuitry to distinguish a signal component received via a signal line (receive signal component) from a signal component concurrently transmitted via that same signal line (transmit signal component). By way of illustration and not limitation, certain embodiments exchange full-duplex communications in response to a determination that a data rate differential for such communications is to be at or above some threshold differential value. In an embodiment, the differential value may be at least three-to-one, for example. In certain embodiments, the data rate differential may be five-to-one or greater.

Alternatively or in addition, full-duplex communications may be based on a determination that such communications are to include one or more particular transmit signal characteristics and/or receive signal characteristics. For example, full-duplex communications may be conditioned upon or otherwise characterized by a signal having a particular rise time and/or fall time—referred to herein generically as a signal transition time. By way of illustration and not limitation, a signal transition time for the slower of signals 132, 134 may be no shorter than some threshold time period such as a single data bit time period of the faster of signals 132, 134—i.e. where "slower" and "faster" here refer, respectively, to a comparatively low data rate and a comparatively high data rate.

In an embodiment, full-duplex communications may be additionally or alternatively conditioned upon or otherwise characterized by a higher data rate signal having what is referred to as a "stable portion" (or "quiet portion") which is concurrent—e.g. at the device which is transmitting the higher data rate signal while receiving a slower data rate signal—with an expected transition time of the slower data rate signal. A "stable portion" refers to two or more consecutive bits of a signal each have the same logic level—e.g. all logic level low (zero "0") or all logic level high (one "1"). The bits of a stable portion may be placeholder bits which provide for stability of the high data rate signal, making any transition of the low data rate signal during communication of the stable portion more easily distinguishable—e.g. by SPC 126 and/or receive circuitry 124.

Figure 2:
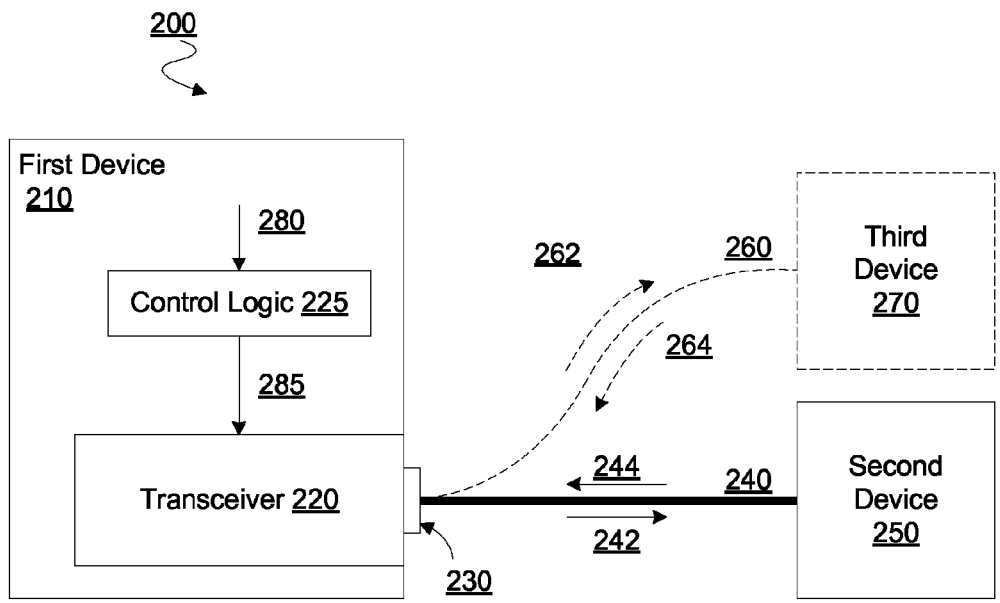
FIG. 2 is a block diagram illustrating elements of a system for performing full-duplex communication according to an embodiment.

FIG. 2 illustrates elements of a system 200 for full-duplex communication according to an embodiment. System 200 may include some or all of the features of system 100, for example. In an embodiment, system 200 includes a first device 210 which provides some or all of the functionality of first device 110. First device 210 may include a transceiver 220 to variously implement communications between first device 210 and one or more other devices. One embodiment may be implemented entirely within transceiver 220, for example. Another embodiment may be implemented by first device 210 as a whole. Still another embodiment may be implemented by system 200 as a whole. Any of a variety of other embodiments may be alternatively implemented according to techniques discussed herein.

First device 210 may include a connector 230, coupled to transceiver 220, to variously connect first device 210 to some other device of system 200 for an exchange of information. In an illustrative embodiment, connector 230 may, at some point in time, couple first device 210 via an interconnect 240 to a second device 250 of system 200—e.g. for a full-duplex exchange of communications between first device 210 and second device 250. Such full-duplex communications may include, for example, transceiver 220 transmitting a signal 242 via a signal line of interconnect 240 and concurrently receiving a signal 244 via the same signal line of interconnect 240.

Connector 230 may include one or more channels, such as pins and/or other interconnect hardware, the configuration of which is compatible with a particular interface standard. For example, connector 230 may be a micro-USB, mini-USB, or standard USB connector with USB 2.0, USB 3.0 or other USB standard. In another embodiment, connector 230 is compatible with one or more of an HDMI standard such as the HDMI 1.4 standard released May 28, 2009 by HDMI Licensing, LLC of Sunnyvale, Calif., a Mobile High-Definition Link (MHL) standard such as the MHL 1.0 specification released Jun. 30, 2010 by the MHL Consortium of Sunnyvale, Calif., a Digital Visual Interface (DVI) standard such as the DVI 1.0 standard released Apr. 2, 1999 by the Digital Display Working Group of Vancouver, Wash., a DisplayPort standard such as the DisplayPort 1.2 standard released Dec. 22, 2009 by the Video Electronics Standards Association of Newark, Calif. and/or the like.

Transceiver 220 may be configured for asymmetric full-duplex communication such as that via one or more signal lines of interconnect 240. For example, transceiver 220 may be variously transitioned at different times between a plurality of configurations including at least one configuration for such asymmetric full-duplex communication. The plurality of configurations may further include a configuration for a different asymmetric full-duplex communication and/or a configuration for symmetric or half-duplex communications, although certain embodiments are not limited in this regard.

In an embodiment, whether and/or how full-duplex communication transceiver 220 might participate in asymmetric full-duplex communications may be predicated, or otherwise based, on an indication of a particular characteristic (or absence of a characteristic) regarding communication capability of second device 250. By way of illustration and not limitation, whether transceiver 220 is to operate in (and, in an embodiment, remain in or transition to) a particular configuration for asymmetric full-duplex communication may be based on an indication that second device 250 includes functionality to support a signal exchange having one or more characteristics. Such one or more characteristics may include, for example, a characteristic of a signal to be received by second device 250 and/or a characteristic of a signal to be transmitted by second device 250. In an embodiment, some or all of the one or more timing characteristics may facilitate transceiver 220 distinguishing signal 244 from signal 242.

For example, first device 210 may include control logic 225 to receive an indication 280 of the presence of a connected device which is capable of receiving a particular type of signal via connector 230 and/or transmitting a particular type of signal to connector 230. In an embodiment, control logic 225 may detect that the connected device—e.g. second device 250—supports a differential between respective data rates of signals in a full-duplex communication. Alternatively or in addition, control logic 225 may detect that the connected device supports a particular timing of signal transitions (also referred to as a "phase" or "offset"), a particular stable (quiet) portion and/or the like. Based on such detection, control logic 225 may send a signal 285 to indicate that transceiver 220 is to operate in a mode which is for asymmetric full-duplex communication—e.g. where signal 285 causes transceiver 220 to transition to a particular configuration for such asymmetric full-duplex communication. For example, transceiver 220 may include transmitter circuitry 122 and receiver circuitry 124, where signal 285 variously sets for each such circuitry one or more of a respective clock speed, buffering rate, signal rise/fall phase, signal rise/fall time, stable period duration, stable period offset and/or the like.

Indication 280 may be provided to control logic 225 based, for example, on a discovery exchange with second device 250 and/or a third-party agent (not shown) to identify capability of second device 250. By way of illustration and not limitation, indication 280 may be forwarded or generated by transceiver 220 in response to a handshake exchange between first device 210 and second device 250—e.g. via interconnect 240 or a sideband channel (not shown). Any of a variety of conventional handshake protocols or other capability discovery mechanisms may be extended or otherwise adapted to provide indication 280 to control logic 225. Certain embodiments are not limited with respect to a particular type of discovery exchange to determine a capability of second device 250 for representation by indication 280.

In an embodiment, the functionality of transceiver 220 allows connector 230 to be variously coupled, decoupled and/or recoupled for various types of communication with the same device and/or with different devices. By way of illustration and not limitation, connector 230 may at some point in time be decoupled from second device 250 and subsequently coupled via an interconnect 260 (e.g. interconnect 240 or some other interconnect) to some third device 270 for an exchange between devices 210, 270. In an embodiment, third device 270 is simply second device 250—e.g. where second device 250 is decoupled from and subsequently recoupled to first device 210 and/or where second device 250 transitions to a configuration for receiving a different type of communication from first device 210. The exchange via interconnect 260 may include other asymmetric full duplex communication, although certain embodiments are not limited in this regard. For example, such full-duplex communications may include transceiver 220 transmitting a signal 262 via a signal line of interconnect 260 and concurrently receiving from third device 270 a signal 264 via the same signal line of interconnect 260. In such an embodiment, control logic 225 may configure transceiver 220 for full-duplex communication with third device 270 which is different—e.g. including having a different data rate differential—from that with second device 250.

Figure 3A:
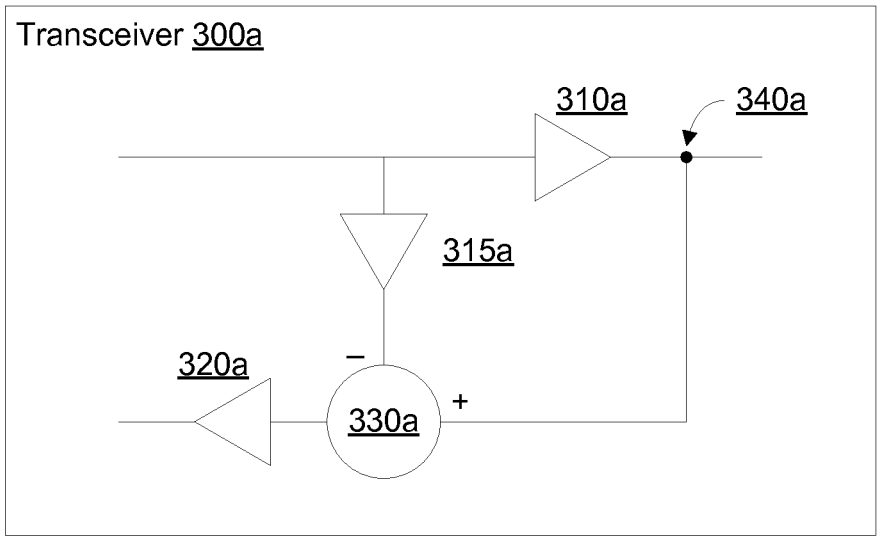
FIGS. 3A through 3C are circuit diagrams illustrating elements of various transceivers for performing full-duplex communication each according to a respective embodiment.

FIG. 3A illustrates elements of a transceiver 300a for participating in asymmetric full duplex communication according to an embodiment. Transceiver 300a may operate in a device such as first device 110—e.g. where transceiver 300a includes some or all of the functionality of transceiver 120 or of transceiver 220.

Asymmetric full-duplex communication may include transceiver 300a transmitting a signal via a signal line coupled to a node 340a, and—concurrent with such transmitting—receiving via the same signal line another signal from the other device. The communication may be asymmetric at least with respect to data rates of the respective signals variously received and transmitted via node 340a. For example, there may be a substantial differential—e.g. at least a three-to-one ratio—between the data rate of a signal transmitted (or received) by transceiver 340 via node 340 and the data rate of a signal concurrently received (or transmitted) by transceiver 340 via node 340.

Transceiver 300a may include signal processing circuitry—e.g. including the illustrative subtractor circuit 330a—coupled to sample or otherwise receive a composite signal at node 340a. At a given time, the composite signal may include a combination of the signal being transmitted by transceiver 300a via the signal line and the concurrent signal being received by transceiver 300a via the signal line. Subtractor circuit 330a may perform signal processing to distinguish one or more receive signal component from one or more transmit signal components.

By way of illustration and not limitation, transmit circuitry of transceiver 300a may drive the transmit signal to node 340a via signal buffer circuitry 310a which is included in or coupled to such transmit circuitry. Such transmit circuitry may further drive the transmit signal—e.g. via other signal buffer circuitry 315a—as a reference (or "dummy") input signal for subtractor circuit 330a. Subtractor circuit 330a may include a differential amplifier, voltage subtractor and/or other such circuit logic to subtract the dummy signal provided by signal buffer circuitry 315a from the composite signal sampled from node 340. Based on such signal subtraction, subtractor circuit 330a may provide an output signal—also referred to herein as a processed signal—to receiver circuitry of transceiver 300a. For example, such receiver circuitry may include or be coupled to signal buffer circuitry 320a at an output of subtractor circuit 330a. In an embodiment, the processed signal received by signal buffer circuitry 320a may be subsequently provided from signal buffer circuitry 320a to digital signal processing circuitry (not shown) of transceiver 300a. For example, the output of signal buffer circuitry 320a may be provided as an input for a finite impulse response (FIR) digital processor which is configured to determine an average of the processed signal.

Such a digital processor may implement a FIR algorithm including, for example, determining a moving average of some integer n samples before and after a current value of the processed signal, and comparing the moving average to a threshold value. If, for example, the average is above such a threshold, then the processed signal may be considered as a logic high (e.g. "1"), otherwise, it may be considered a logic low (e.g. "0"). In another embodiment, the FIR algorithm may be use a weighted moving average algorithm that assigns different weights to data at different positions in the sample window. The digital processor may intelligently apply such weights dynamically—e.g. depending up on previous data samples. For example, if the processor detects the occurrence of an error at a particular position in the sampling window then that particular position can be given a "zero" weight or "negative" weight.

The distinguishing of receive signal components may be complicated by a need for an edge timing match during the signal subtraction by subtractor circuit 330a. More particularly, if rise/fall times of the signal output from signal buffer circuitry 315a are not well matched with rise/fall times of the signal output from signal buffer circuitry 310a then subtractor circuit 330a may not subtract transmit signal components adequately. Certain embodiments variously exploit the realization that such edge timing may be less precise if there is a substantial data rate differential between the transmit signal and the receive signal. By contrast, conventional transceiver architectures for providing symmetric, full-duplex communication typically require high band-width signal subtractors, which pose their own design difficulties.

Figure 3B:
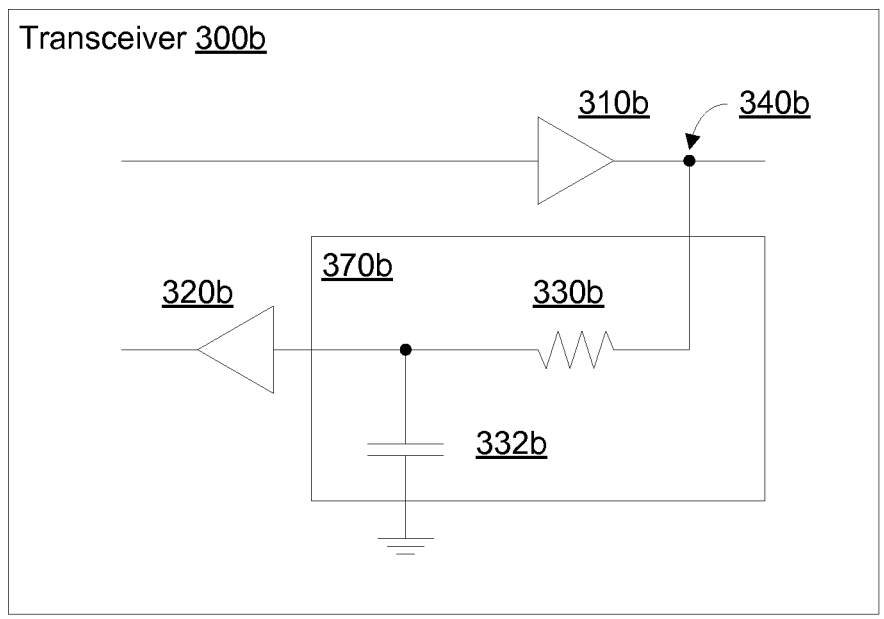

FIG. 3B illustrates elements of a transceiver 300b for participating in asymmetric full duplex communication according to an embodiment. Transceiver 300b may provide an alternate architecture for communications such as that performed by transceiver 300a. For example, transceiver 300b may include or couple to a node 340b which corresponds functionally to node 340a. Transceiver 300b may transmit a signal via a signal line coupled to a node 340b, and—concurrent with such transmitting—receive via the same signal line a signal from another device. For example, transmit circuitry of transceiver 300b may drive the transmit signal to node 340b via signal buffer circuitry 310b which is included in or coupled to such transmit circuitry.

Band-pass filter circuitry 370b of transceiver 300b—in this embodiment, including an RC circuit comprising resistor 330b and capacitor 332b—may be coupled to receive a composite signal at node 340b. The band-pass filter circuitry 370b may provide signal filtering to distinguish one or more receive signal component from one or more transmit signal components. For example, resistor 330b and capacitor 332b may be configured to pass signal components in a frequency range in which the receive signal predominates, and to filter signal components in another frequency range in which the transmit signal predominates. By way of illustration and not limitation, the RC circuit serve as a low-pass filter, where the signal transmitted by transceiver 300b via node 340b is a high data rate signal, as compared to the signal concurrently received by transceiver 300b via node 340b.

Based on such signal filtering, the signal processing circuitry of transceiver 300b may output a processed signal to receiver circuitry of transceiver 300b. For example, such receiver circuitry may include or be coupled to signal buffer circuitry 320b which, in turn, is coupled to an output node of the RC circuit. In an embodiment, the processed signal received by signal buffer circuitry 320b may be subsequently provided from signal buffer circuitry 320b to digital signal processing circuitry (not shown) of transceiver 300b, such as a FIR digital processor which is configured to determine an average of the processed signal.

The RC circuit of transceiver 300b is only one example of various bandpass circuits which may receive a composite signal at node 340b and provide a filtered version of that signal to buffer circuitry 320b. In another embodiment, any one of a variety of conventional high-pass filter circuits and/or high order analog circuits may instead be adapted for use in transceiver 300b.

Figure 3C:
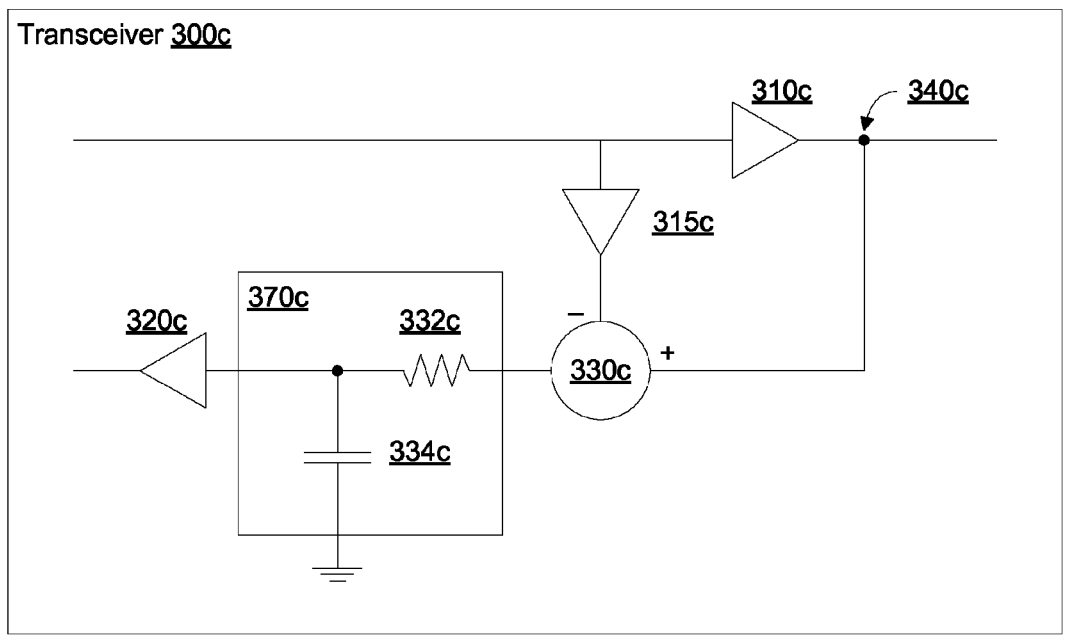

FIG. 3C illustrates elements of a transceiver 300c for participating in asymmetric full duplex communication according to an embodiment. Transceiver 300c provides another alternate architecture for communications such as that performed by transceiver 300a. For example, transceiver 300c may include or couple to a node 340c which corresponds functionally to node 340a.

In an embodiment, transceiver 300c includes signal buffer circuitry 310c, 315c, 320c, the functionality of which may correspond, respectively, to that of signal buffer circuitry 310a, 315a, 320a. Alternatively or in addition, transceiver 300c may include signal processing circuitry such as a subtractor circuit 330c including, for example, some or all of the features of subtractor circuit 330a. For example, subtractor circuit 330c may be coupled to sample at node 340c a composite signal including a combination of a signal which transceiver 300c is transmitting via a signal line coupled to node 340c and another signal which transceiver 300c is concurrently receiving via the same signal line. Based on the signal sampled from node 340c, subtractor circuit 330c may generate a processed signal—e.g. including subtractor circuit 330c subtracting from the sampled signal a dummy transmit signal from signal buffer circuitry 315c.

In an embodiment, the processed signal is provided from subtractor circuitry 330c to band-pass filter circuitry 370c which, for example, includes some or all of the features of band-pass filter circuitry 370b. In the illustrative embodiment, band-pass filter circuitry 370c includes an RC circuit comprising resistor 332c and capacitor 334c. The RC circuit may provide additional (in this case, passive) signal processing to pass one or more receive signal components and to filter one or more transmit signal components. Based on such signal filtering, the signal processing circuitry of transceiver 300c may output a processed signal to receiver circuitry of transceiver 300c. For example, such receiver circuitry may include or be coupled to signal buffer circuitry 320c which, in turn, is coupled to an output node of the RC circuit. In an embodiment, the processed signal received by signal buffer circuitry 320c may be subsequently provided from signal buffer circuitry 320c to digital signal processing circuitry (not shown) of transceiver 300c, such as a FIR digital processor which is configured to determine an average of the processed signal.

Figures 4A, 4B:
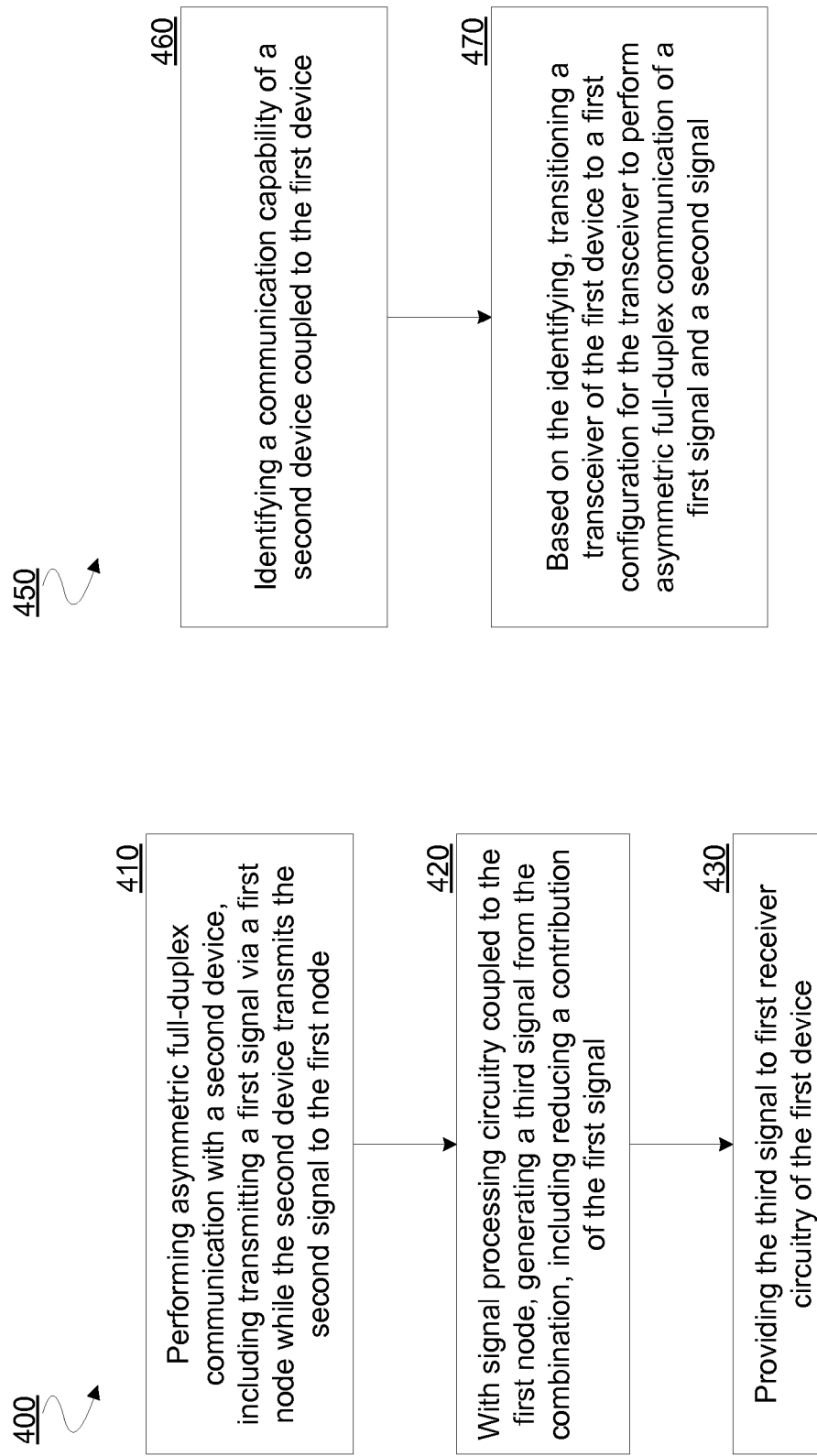
FIG. 4A is a flow diagram illustrating elements of a method for performing full-duplex communication according to an embodiment.
FIG. 4B is a flow diagram illustrating elements of a method for configuring a transceiver according to an embodiment.

FIG. 4A illustrates elements of a method 400 for exchanging wire line communications according to an embodiment. Method 400 may be performed by a device in a system having some or all of the features of system 100, for example. By way of illustration and not limitation, method 400 may be performed by a first device including some or all of the features of transceiver 120.

In an embodiment, method 400 includes, at 410, performing asymmetric full-duplex communication with a second device coupled to the first device. The asymmetric full-duplex communication at 410 may include transmitting a first signal from the first device via a first node while the second device transmits a second signal to the first node. During such respective exchanges of the first signal and second signal, the first node may include a combination of the first signal and the second signal.

In an embodiment, the full duplex asymmetric communication performed at 410 is characterized by a substantial data rate differential—e.g. a difference in the respective data rates of the first signal transmitted from the first device and the second signal received by the first device. The full duplex asymmetric communication may include any of a variety of additional or alternative signal characteristics, according to different embodiments. By way of illustration and not limitation, one of the first signal and the second signal—e.g. the signal having a comparatively higher data rate—may include one or more stable portions which each coincide with a respective transition time (or expected transition time) for the other of the first signal and the second signal. Alternatively or in addition, the slower of the first signal and the second signals may be characterized by a rise/fall time which is longer than some threshold time period—e.g. a bit time period for the faster of the first signal and the second signals. Alternatively or in addition, the slower of the first signal and second signal may be timed with an offset/phase for transitions between logical states to take place in-between the closest transition times for the faster of the first signal and second signal.

Method 400 may further include, at 420, generating—with signal processing circuitry coupled to the first node—a third signal from the combination of the first signal and the second signal. The generating at 420 may include reducing a contribution by the first signal. For example, reducing the contribution may include a band-pass filter or other filter circuitry passing a receive signal component and filtering a transmit signal component. Alternatively or in addition, reducing the contribution may include subtracting from the signal combination a reference (or "dummy") signal representing the first signal.

In an embodiment, method 400 further comprises, at 430, providing the third signal to first receiver circuitry of the first device. Method 400 may include one or more other operations (not shown) for the first receiver circuitry to identify from the third signal information represented in the second signal. For example, the first receiver circuitry may include or couple to a digital signal processor circuit to perform finite impulse response circuit processing of the third signal provided at 430. Alternatively or in addition, additional processing based on the third signal may include generation of a single-ended signal based on a received differential signal pair which includes the second signal.

FIG. 4B illustrates elements of a method 450 for configuring a communication device according to an embodiment. Method 450 may be performed by a device in a system such as system 100, for example. By way of illustration and not limitation, method 450 may be performed by control logic 225 or any of a variety of other devices including some or all of the features of control logic 225. Method 450 may be performed in preparation for method 400, although certain embodiments are not limited in this regard.

Method 450 may include, at 460, identifying a communication capability of a second device coupled to a first device. The identifying at 460 may include determining that the second device supports a substantial data rate differential for full-duplex communication. Alternatively or in addition, the communication capability identified at 460 may include an ability to include a stable portion in a signal which the second device is to transmit or an ability to recognize a stable portion in a signal which the second device is to receive from the first device. Alternatively or in addition, the communication capability identified at 460 may include an ability to provide a particular rise/fall time in a signal which the second device is to transmit, or to accommodate such a rise/fall time in a signal which the second device is to receive from the first device. Alternatively or in addition, the communication capability identified at 460 may include an ability to support a particular phase/offset between transition times of a signal which the second device is to transmit to the first device and transition times of a signal which the second device is to receive from the first device.

In an embodiment, method 450 further comprises, based on the identifying at 460, transitioning at 470 a transceiver of the first device to a first configuration for the transceiver to perform asymmetric full-duplex communication of a first signal and a second signal. The transitioning at 470 may include independently regulating respective configurations of transmit circuitry and receive circuitry of the transceiver. By way of illustration and not limitation, the transitioning at 470 may include changing one or more of a buffer rate, a clock rate, a signal rise/fall time, a signal rise/fall phase (timing offset) and/or the like.

Figure 5:
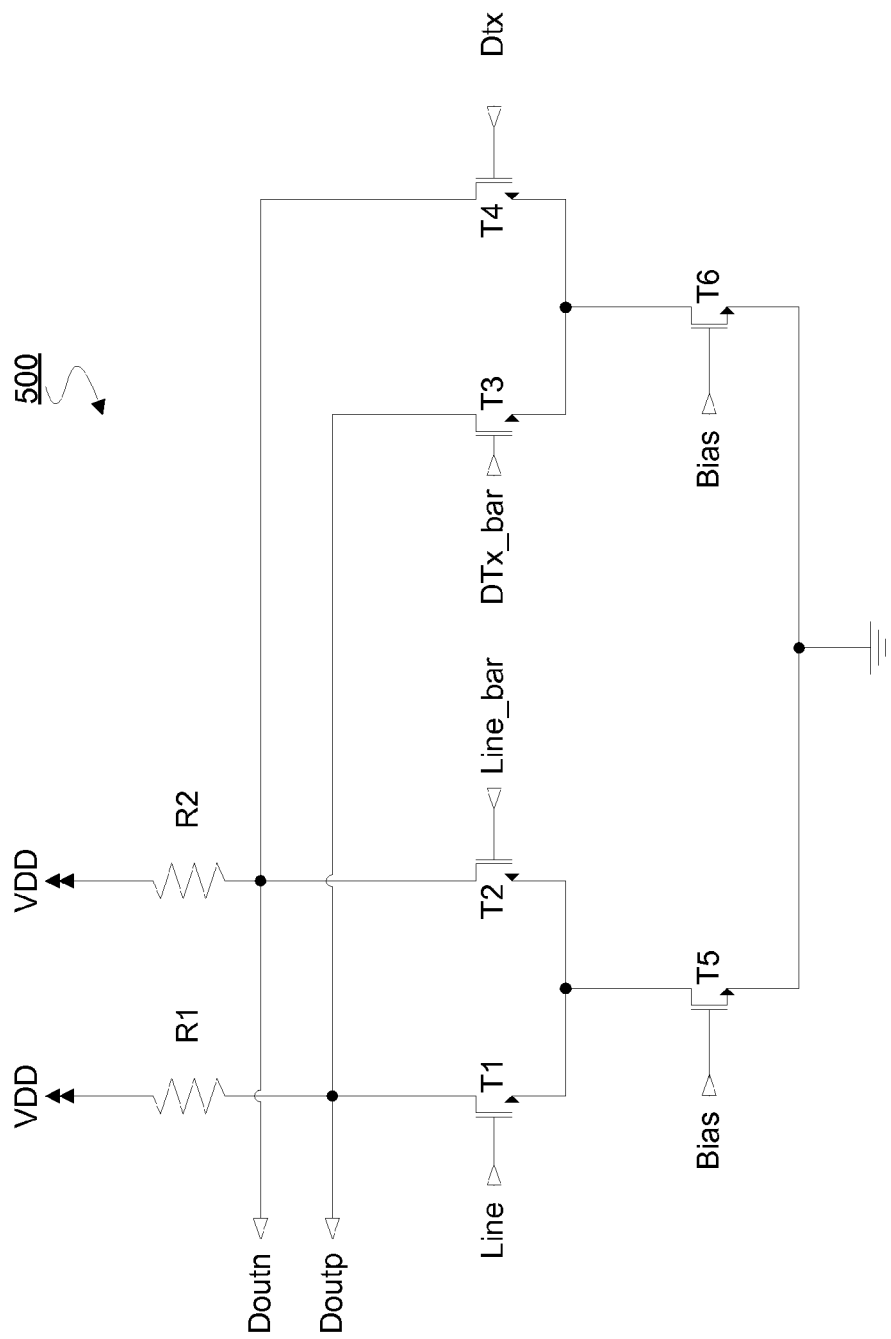
FIG. 5 is a circuit diagram illustrating elements of a transceiver for performing full-duplex communication according to an embodiment.

FIG. 5 illustrates elements of a transceiver 500 for performing asymmetric full-duplex communication according to an embodiment. The circuit elements shown in FIG. 5 represent signal processing circuitry which, for example, may operate for distinguishing receive signal components from transmit signal components. Such signal processing circuitry may include some or all of the features of subtractor 330a, although certain embodiments are not limited in this regard.

Transceiver 500 may provide for processing of a composite signal at a node coupled to a signal line which, for example, is one of a differential signal line pair. For example, the signal processing circuitry may be coupled to variously sample or otherwise receive composite signals Line, Line_bar of a differential signal, each of composite signals Line, Line_bar at a different respective node.

In an embodiment, transceiver 500 includes transistors T1, T2 which are coupled to a supply voltage VDD via resistors R1, R2, respectively. The gate terminals of transistors T1, T2 may serve as inputs for sampling signals Line, Line_bar, respectively. Transceiver 500 may further comprise transistors T3, T4 which are also coupled to VDD via resistors R1, R2, respectively. The gate terminals of transistors T3, T4 may serve as inputs for sampling a reference (or "dummy") version of a differential signal line pair which is being transmitted via the differential signal line pair. This reference signal pair is represented as signals DTx and DTx_bar. In an embodiment, a signal Bias provided to transistor T5, T6 of transceiver 500 may provide for biasing of the signal processing circuitry.

In an embodiment, the signal processing circuitry outputs a differential pair of processed signals Doutp, Doutn based on Line, Line_bar, DTx and DTx_bar. For example, at a given point in time, the level of Doutp may represent a difference between the signals Line, DTx, the level of Doutn may represent a difference between the signals Line_bar, DTx_bar. The differential pair of processed signals Doutp, Doutn may be provided to receiver circuitry (not shown) of transceiver 500 for processing which, for example, may include one or more conventional analog-to-digital signal processing techniques.

Figure 6A:
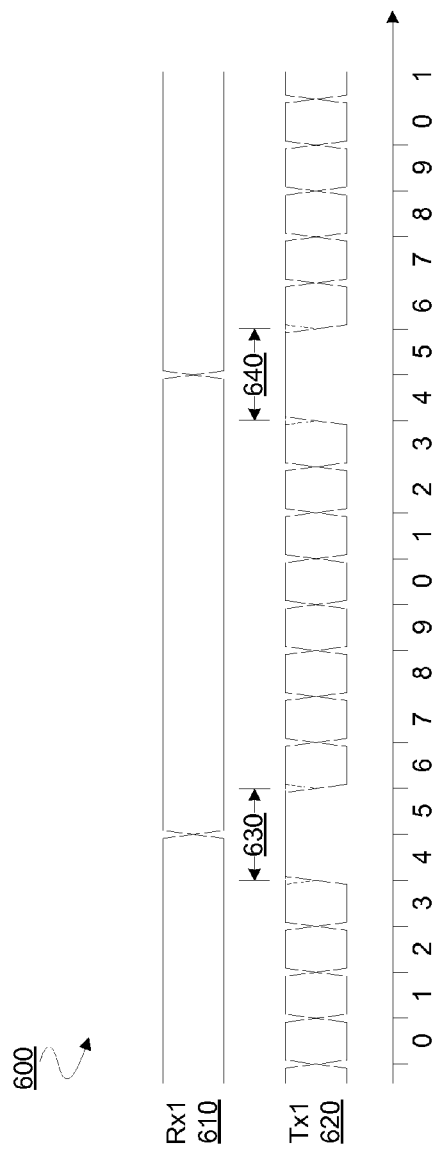
FIG. 6A is a timing diagram illustrating elements of a full-duplex communication performed according to an embodiment.

FIG. 6A is a timing diagram 600 illustrating asymmetric full-duplex communication according to one embodiment. Timing diagram 600 may represent a communication exchange implemented with method 400, for example. As shown in timing diagram 600, the asymmetric full-duplex communication may include a signal Rx1 610 being received by a transceiver via a signal line, and a signal Tx1 620 being transmitted by the transceiver via the same signal line concurrently with receipt of Rx1 610.

In an embodiment, a data rate of Rx1 610 may be substantially lower than a data rate of Tx1 620. In the illustrative scenario represented in timing diagram 600, Tx1 620 communicates at a bit-per-second rate which is at or near ten (10) times that of Rx1 610. From the perspective of the other device participating in the asymmetric full-duplex communication, the reverse is true—i.e. where Rx1 610 is a transmitted signal with a data rate substantially lower than a data rate of a signal Tx1 620 being received. In certain embodiments, asymmetric full-duplex communications are characterized by a data rate differential of at least three-to-one—e.g. whether a receive-to-transmit ratio of data rates or a transmit-to-receive ratio of data rates.

To aid in the distinguishing of receive signal components from transmit signal components, the transceiver may include one or more stable portions—e.g. portions 630, 640—which coincide with transition times (e.g. for actual or merely expected transitions) of Rx1 610. The particular timing and duration of portions 630, 640 is merely illustrative, and may vary according to implementation-specific details. The absence of any logic state transition for Tx1 620 during portions 630, 640 may reduce or eliminate the possibility of relatively high frequency transition components due to Tx1 620 being interpreted by signal processing circuitry (and/or receiver circuitry) as due to Rx1 610.

Figure 6B:
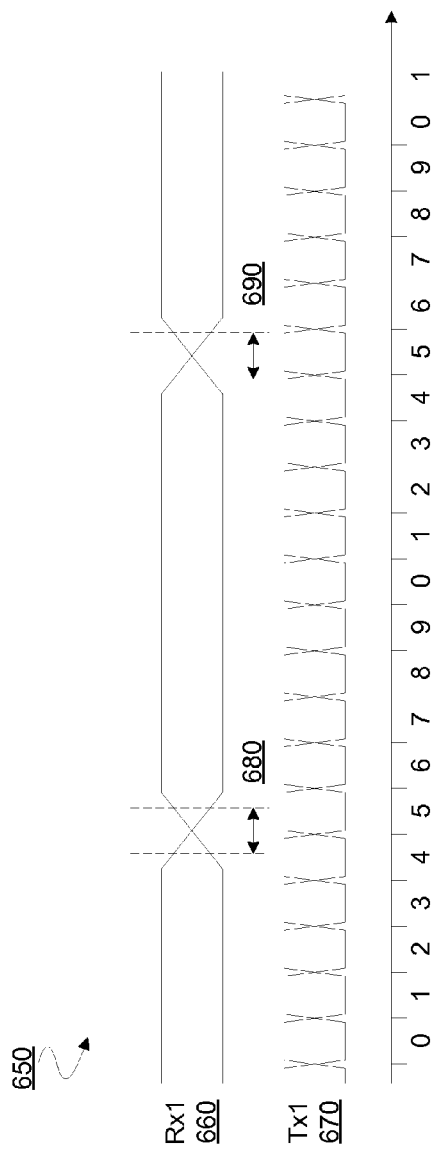
FIG. 6B is a timing diagram illustrating elements of a full-duplex communication performed according to an embodiment.

FIG. 6B is a timing diagram 650 illustrating asymmetric full-duplex communication according to another embodiment. Timing diagram 650 may represent a communication exchange implemented with method 400, for example. As shown in timing diagram 650, the asymmetric full-duplex communication may include a transceiver receiving a signal Rx1 660 via a signal line and concurrently transmitting a signal Tx1 670 via the same signal line.

In an embodiment, one of the exchanged signals has a substantially higher data rate than the other of the exchanged signals—e.g. where Tx1 670 carries data at a bit-per-second rate which is at or near ten (10) times that of Rx1 660. To aid in the distinguishing of receive signal components from transmit signal components, the rise/fall time of the slower of Rx1 660 and Tx1 670 may be equal than or greater than some minimum threshold time duration. For example, the minimum threshold time duration may be equal to or otherwise based on a single data bit time period of the faster of Rx1 660 and Tx1 670. Here, "single data bit time period" refers to the time period between transition times (e.g. for actual or merely possible transitions) for a signal.

By way of illustration and not limitation, the time between logic state transitions of Tx1 670 may be no smaller than some duration which is variously represented in timing diagram 650 by periods 680, 690. In such an embodiment, the rise/fall time for logic state transitions of Rx1 670 may be equal or longer than such a duration. The comparatively slow rise/fall time of Rx1 660 may reduce the presence of high frequency components in Rx1 660 which might be confused with concurrent high frequency components of Tx1 670. Consequently, low-pass filtering may more readily be used to reduce a contribution by Tx1 670 to a signal, thereby facilitating the distinguishing of one or more signal components of Rx1 660. In certain embodiments, the comparatively slow rise/fall time of a transmitted (or received) signal may coincide with a stable portion of a received (or transmitted) signal.

Figure 7:
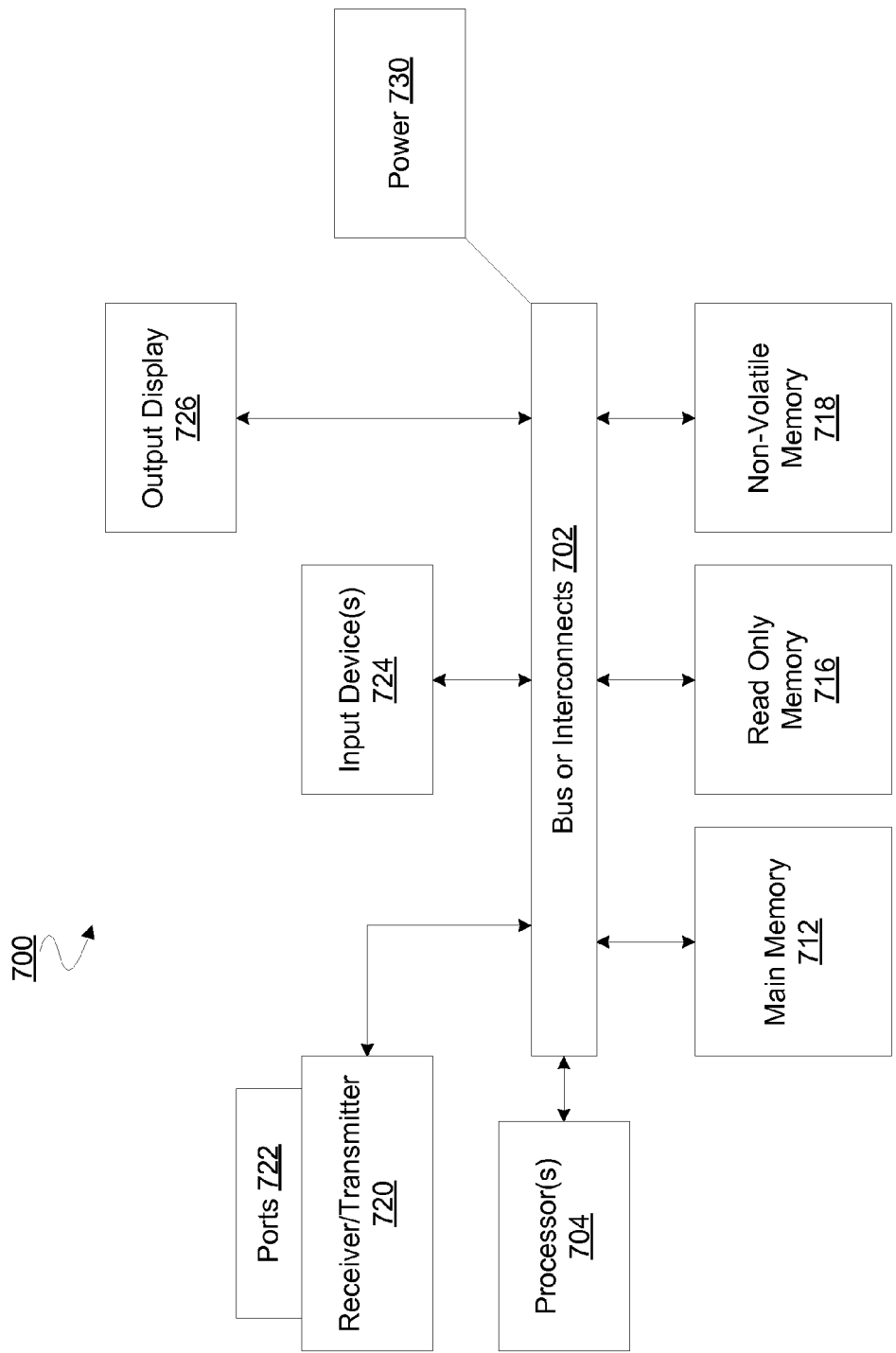
FIG. 7 is a block diagram illustrating elements of a computer system for performing full-duplex communication according to an embodiment.

FIG. 7 is an illustration of an apparatus or system for transmitting analog signals according to an embodiment. Such an apparatus or system may include some or all of the features of first device 110, for example. In an embodiment, the apparatus or system includes circuitry to perform method 400.

In some embodiments, an apparatus or system 700 (referred to generally in this discussion as an apparatus) comprises an interconnect or crossbar 702 or other communication means for transmission of data. The apparatus 700 may include a processing means such as one or more processors 704 coupled with the interconnect 702 for processing information. The processors 704 may comprise one or more physical processors and/or one or more logical processors. The interconnect 702 is illustrated as a single interconnect for simplicity, but may represent multiple different interconnects or buses and the component connections to such interconnects may vary. The interconnect 702 shown in FIG. 7 is an abstraction that represents any one or more separate physical buses, point to point connections, or both connected by appropriate bridges, adapters, controllers and/or the like.

In some embodiments, the apparatus 700 further comprises a random access memory (RAM) or other dynamic storage device or element as a main memory 712 for storing information and instructions to be executed by the processors 704.

In some embodiments, main memory may include active storage of applications including a browser application for using in network browsing activities by a user of the apparatus 700. In some embodiments, memory of the apparatus may include certain registers or other special purpose memory.

The apparatus 700 also may comprise a read only memory (ROM) 716 or other static storage device for storing static information and instructions for the processors 704. The apparatus 700 may include one or more non-volatile memory 718 for the storage of certain elements, including, for example, flash memory, a hard disk, solid-state drive and/or the like.

A receiver/transmitter 720 may also be coupled to the interconnect 702. The receiver/transmitter 720 may include or couple to one or more ports 722 for the connection of one or more other apparatuses (not shown). In some embodiments, receiver/transmitter 720 includes some or all of the features of transceiver 120. For example, receiver/transmitter 720 may include transmit circuitry, receive circuitry and signal processing circuitry for performing asymmetric full-duplex communication according to an embodiment.

The apparatus 700 may also be coupled via the interconnect 702 to an output display 726. In some embodiments, the display 726 may include a liquid crystal display (LCD) or any other display technology, for displaying information or content to a user, including three-dimensional (3D) displays. In some environments, the display 726 may include a touch screen that is also utilized as at least a part of an input device. In some environments, the display 726 may be or may include an audio device, such as a speaker for providing audio information.

The apparatus 700 may also comprise a power device or apparatus 730, which may comprise a power supply, a battery, a solar cell, a fuel cell, or other system or device for providing or generating power. The power provided by the power device or system 730 may be distributed as required to elements of the apparatus 700.

Techniques and architectures for exchanging wire line communications are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A first device comprising:
   a first transceiver configured to perform, with a second device coupled to the first device, asymmetric full-duplex communication of a first signal and a second signal, the first transceiver including:
   first transmitter circuitry configured to transmit the first signal from the first device via a first node while the second device transmits the second signal to the first node,
   wherein a superimposed signal of the first signal and the second signal is formed at the first node:
   signal processing circuitry coupled to the first node, the signal processing circuitry configured to generate a third signal from the superimposed signal, including the signal processing circuitry to reduce a contribution by the first signal; and first receiver circuitry coupled to receive the third signal from the signal processing circuitry, wherein one of the first signal and the second signal includes a stable portion comprised of two or more consecutive placeholder bits which each have the same logic level, wherein an exchange of the stable portion is concurrent with a transition time of the other of the first signal and the second signal.

2. The first device of claim 1, wherein a data rate differential for the first signal and the second signal is at least three-to-one.

3. The first device of claim 1, wherein a data rate of the first signal is faster than a data rate of the second signal, and, wherein a logic state transition time of the second signal is equal to or greater than a single data bit time period of the first signal.

4. The first device of claim 1, wherein the first signal is one of a first differential signal pair and wherein the second signal is one of a second differential signal pair.

5. The first device of claim 1, wherein the signal processing circuitry to reduce the contribution by the first signal includes the signal processing circuitry to band-pass filter the superimposed signal.

6. The first device of claim 5, wherein the signal processing circuitry to band-pass filter the superimposed signal includes the signal processing circuitry to low-pass filter the superimposed signal.

7. The first device of claim 1, wherein the signal processing circuitry to reduce the contribution by the first signal includes the signal processing circuitry to subtract a dummy version of the first signal from the superimposed signal.

8. A method at a first device, the method comprising:
performing asymmetric full-duplex communication with a second device coupled to the first device, including transmitting a first signal from the first device via a first node while the second device transmits a second signal to the first node, wherein a superimposed signal of the first signal and the second signal is formed at the first node;

with signal processing circuitry coupled to the first node, generating a third signal from the superimposed signal, including reducing a contribution by the first signal; and providing the third signal to first receiver circuitry of the first device, wherein one of the first signal and the second signal includes a stable portion comprised of two or more consecutive placeholder bits which each have the same logic level, wherein an exchange of the stable portion is concurrent with a transition time of the other of the first signal and the second signal.

9. The method of claim 8, wherein a data rate differential for the first signal and the second signal is at least three-to-one.

10. The method of claim 8, wherein a data rate of the first signal is faster than a data rate of the second signal, and, wherein a logic state transition time of the second signal is equal to or greater than a single data bit time period of the first signal.

11. The method of claim 8, wherein the first signal is one of a first differential signal pair and wherein the second signal is one of a second differential signal pair.

12. The method of claim 8, wherein reducing the contribution by the first signal includes band-pass filtering the superimposed signal.

13. The method of claim 12, wherein band-pass filtering the superimposed signal includes low-pass filtering the superimposed signal.

14. The method of claim 8, wherein reducing the contribution by the first signal includes subtracting a dummy version of the first signal from the superimposed signal.

* * * * *